United States Patent [19]

Shiga et al.

[11] Patent Number: 5,549,011
[45] Date of Patent: Aug. 27, 1996

[54] STARTER

[75] Inventors: Tsutomu Shiga, Nukata-gun; Nobuyuki Hayashi, Nagoya; Masanori Ohmi, Anjo; Yasuhiro Nagao, Okazaki, all of Japan

[73] Assignee: Nippondenso Co., Ltd., Kariya, Japan

[21] Appl. No.: 392,111

[22] Filed: Feb. 22, 1995

[30] Foreign Application Priority Data

Sep. 19, 1994 [JP] Japan ................... 6-222327

[51] Int. Cl.⁶ ........................... F02N 15/06; F16D 41/064
[52] U.S. Cl. ................... 74/7 E; 74/7 A; 74/7 C; 188/82.84; 192/45; 475/318
[58] Field of Search ................... 74/6, 7 A, 7 C, 74/7 E; 188/82.84; 192/42, 45; 475/318

[56] References Cited

U.S. PATENT DOCUMENTS

| | | | |
|---|---|---|---|
| 1,375,576 | 4/1921 | Duca | 192/45 X |
| 1,443,248 | 1/1923 | Defordt | 192/45 |
| 2,286,419 | 6/1942 | Krenzke | 192/45 X |
| 3,132,574 | 5/1964 | Ernisse | 192/45 X |
| 4,615,227 | 10/1986 | Stockton | 74/7 E |
| 4,680,979 | 7/1987 | Morishita et al. | 74/7 E |
| 4,852,708 | 8/1989 | Parkhurst | 74/7 C X |
| 4,918,324 | 4/1990 | Isozumi | 74/7 A X |
| 5,088,338 | 2/1992 | Konishi | 74/7 E |
| 5,154,090 | 10/1992 | Konishi | 74/7 E |
| 5,156,057 | 10/1992 | Isozumi | 74/7 E |
| 5,195,389 | 3/1993 | Isozumi | 74/7 E |
| 5,199,309 | 4/1993 | Isozumi | 475/318 X |
| 5,276,945 | 1/1994 | Matsumura | 188/82.84 X |
| 5,318,160 | 6/1994 | Oomi et al. | 192/45 |

FOREIGN PATENT DOCUMENTS

| | | | |
|---|---|---|---|
| 985374 | 7/1951 | France. | |
| 2625770 | 7/1989 | France. | |
| 52-19528 | 7/1950 | Japan. | |
| 14023 | 3/1897 | Switzerland | 192/45 |
| 124821 | 3/1959 | U.S.S.R. | 192/45 |
| 22203 | 11/1899 | United Kingdom | 192/45 |
| 19181 | 9/1902 | United Kingdom | 192/45 |
| 140380 | 12/1920 | United Kingdom. | |

OTHER PUBLICATIONS

Patent Abstract of Japan, vol. 009 No. 073 (M-368) Apr./1985, re JP-A 59-203869.

Primary Examiner—Allan D. Herrmann
Attorney, Agent, or Firm—Cushman, Darby & Cushman

[57] ABSTRACT

A starter having a highly reliable overrunning clutch which has grooves on both a clutch member inner and a clutch outer member. Rollers are sandwiched from the front and rear torque conveyance direction by the roller contact surface of each groove, so a large stress such as with the roller-type overrunning clutch using the wedge-effect is not applied on each contact surface and roller contact surface. This reduces the inertia of the clutch, and suppresses the impact force generated when a pinion engages an engine ring gear.

13 Claims, 8 Drawing Sheets

STARTER

CROSS REFERENCE TO RELATED APPLICATION

This application is based upon and claims priority of Japanese Patent application Ser. No. 6-222327 filed Sep. 19, 1994, the content of which is incorporated herein by reference.

BACKGROUND OF THE INVENTION

1. Field of the Invention

The present invention generally relates to a starter having an overrunning clutch used for starting internal combustion engines.

2. Related Art

In the conventional starter with epicycle gear reduction mechanism disclosed in Japanese Patent Laid-open Ser. No. 52-19528, an overrunning clutch is set between the outer circumference surface of an internal gear of an epicycle gear reduction mechanism and inner circumference surface of casing that acts as the fixing side to store the epicycle gear reduction mechanism.

With the conventional structure explained above, the advantages include that the overrunning clutch is set on the outer circumference of the epicycle gear reduction mechanism so the axial direction space used by the overrunning clutch is not required, the dead space is small, and increased manufacturing costs caused by an increase in weight are low. Furthermore, even if a drive transmission portion with a large diameter is required for the high-load overrunning clutch, the outer circumference of the epicycle gear reduction mechanism can be used.

With the conventional structure explained above, however, rollers bite, in the small narrow direction, into wedge-shaped spaces formed between a cam-shaped groove set on the inner circumference of a clutch outer and inclined circumferentially and an outer circumference of a clutch inner that is the outer circumference of the internal gear. This causes a wire contact, and the torque is conveyed with the frictional force generated there. Therefore, the clutch outer member and clutch inner member must be able to withstand an extremely large stress that occurs on the contact surface with the rollers. A high-strength metal material (e.g., heat treated iron and steel material) must be used for the clutch inner member and clutch outer member. Thus, it is not possible to reduce the operational sound when the internal gear engages with planetary gears by manufacturing the epicycle gear reduction mechanism internal gear by resin.

Furthermore, this overrunning clutch has a structure wherein the rotational force is conveyed when the rollers bite, in the small narrow direction, into the wedge-shaped space formed between the cam-shaped groove set on the inner circumference of the bracket which is the fixing side of the clutch outer member and inclined circumferentially and the outer circumference of the internal gear of the epicycle gear reduction mechanism that is the clutch inner member. Therefore, when the starter overruns, the internal gear that acts as the clutch inner members is rotated at a high speed, and since these are made of metal and heavy, the inertia energy during rotation is large. If the engine is rapidly changed from the overrun state to the drive state, the impact applied on the other clutch parts increases, an unbalance occurs during rotation, the device may be damaged or an abnormal noise may be heard during drive.

Furthermore, as the clutch outer member (roller cam) is mounted on the front bracket, when the starter is overrun by the engine, the ring gear (clutch inner member) rotates to absorb the rotational difference between the pinion gear rotated by the engine and the starter motor so that the overrun rotation is not conveyed to the starter motor. The rollers wear at this time because the rollers constantly contact the outer circumference of this clutch inner member.

SUMMARY OF THE INVENTION

It is an object of the present invention to provide a starter with highly reliable overrunning clutch which assuredly conveys the torque.

In the starter according to the present invention, grooves are formed on both a clutch inner member and clutch outer member, so that rollers contact each groove. The rollers are sandwiched from the front and rear torque conveyance direction by the roller contact surface of the grooves, so a large stress such as with the roller-type overrunning clutch using the wedge-effect is not applied on each groove contact surface and roller contact surface. Thus, resin or nonferrous metal can be used for the clutch inner member or clutch outer member. This allows lightweight material with material and machining costs lower than iron and steel material can be used, allowing a low cost and lightweight overrunning clutch to be provided. The inertia of the clutch is reduced, and the impact force generated when the pinion engages an engine ring gear can be suppressed to the lowest limit. The machining is also easier when forming complicated grooves on the clutch outer member and inner member.

Preferably, when the clutch outer runs idly to the clutch inner member to absorb the rotational difference between the starter motor and pinion gear when the starter is overrun by the engine, the rollers receive the centrifugal force and separate from the outer circumference of the clutch inner member. This prevents abnormal wear of the rollers or outer circumference of the clutch inner member.

More preferably, the number of grooves on the clutch inner member is larger than the number of grooves on the clutch outer member, so if the rollers reengage with the roller grooves when the starter is started, such as when the rollers are not engaged with the roller groove or when the engine is suddenly stopped from the starter overrun state and suddenly driven again, the idle run distance between the clutch inner member and clutch outer member is shortened, and the impact generated during engagement can be suppressed.

More preferably, the roller engagement surface has a curvature ratio that is approximately the same as the roller radius, so the torque conveyance surface widens, and a clutch with a large torque capacity can be provided.

Still more preferably, the roller engagement surface in the grooves has a curvature radius that is approximately the same as the roller radius, so a clutch with an even larger torque capacity can be provided.

DETAILED DESCRIPTION OF THE PREFERRED EMBODIMENTS

The present invention will be described in detail hereinunder with reference to the embodiments shown in the accompanying drawings.

The first embodiment of the starter according to the present invention is shown in FIG. 1 through FIG. 11.

Figure 1:
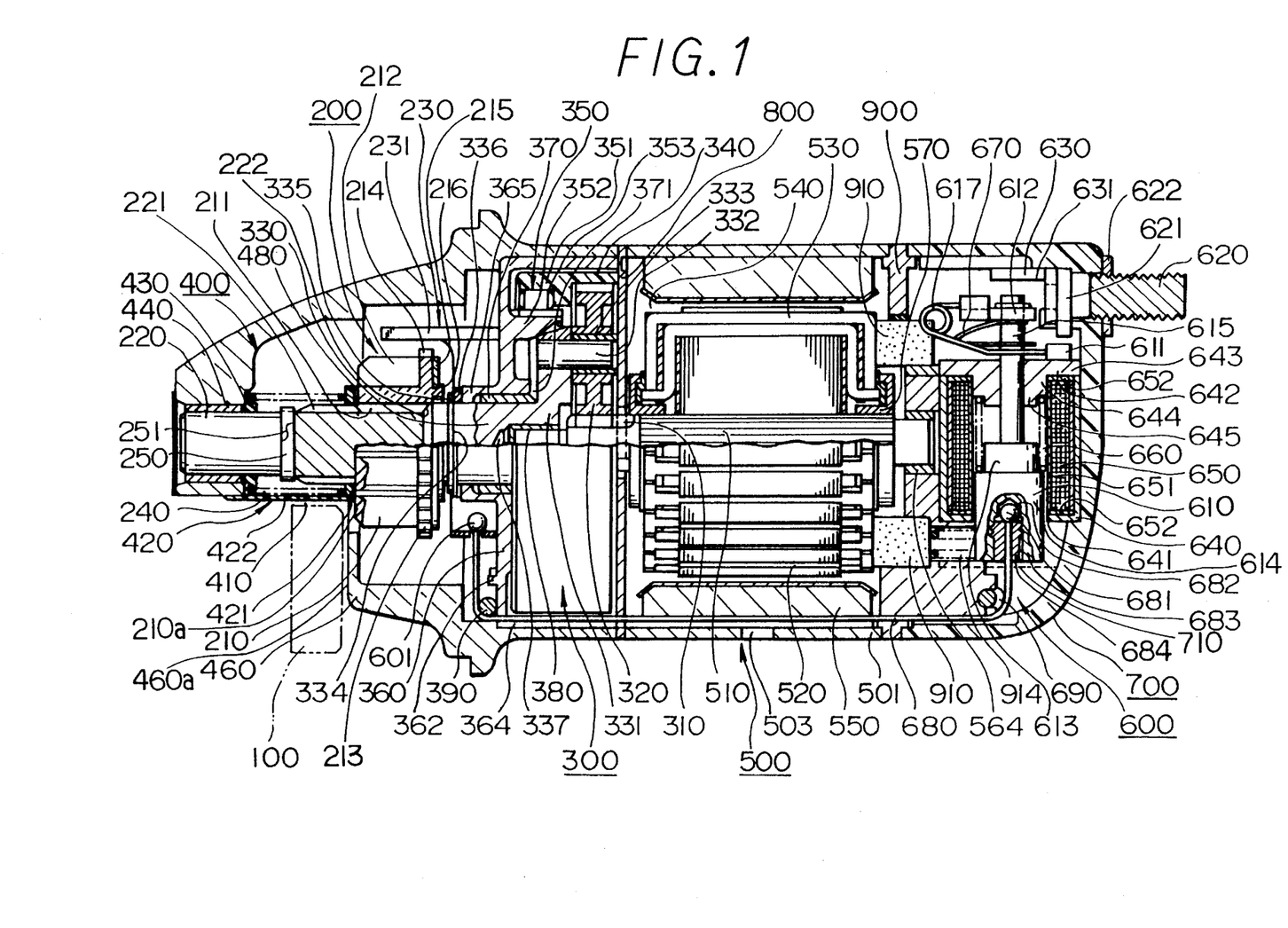
FIG. 1 is a side cross-sectional view illustrating the first embodiment of a starter according to the present invention.

The starter is largely comprised of a pinion 200 that engages with an engine ring gear 100 laid on an engine (not shown), a housing 400 that covers an epicycle gear speed reduction mechanism 300, a starter motor 500, and an end frame 700 that covers a magnet switch 600. Inside the starter, the housing 400 and motor 500 are separated by a motor wall 800, and the motor 500 and end frame 700 are separated by a brush holding member 900.

Pinion 200

Figure 2A:
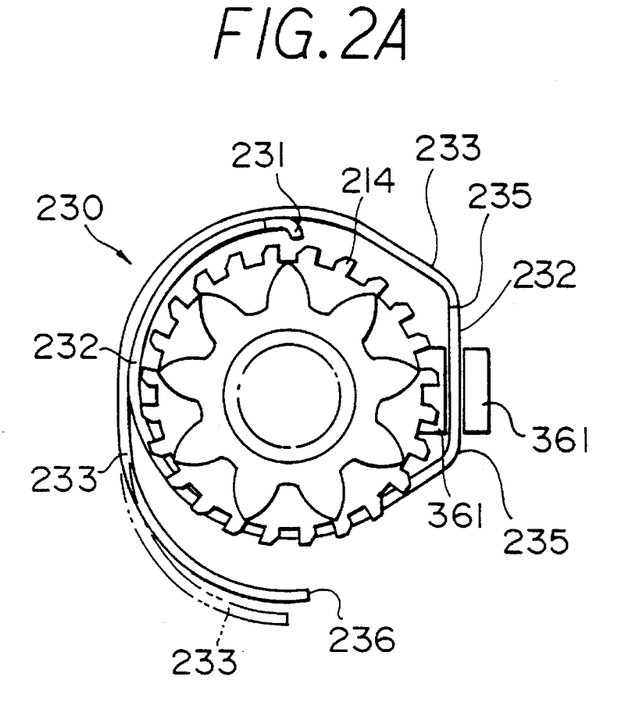
FIGS. 2A and 2B are a front view and partial cross-sectional view illustrating the pinion rotating restriction member in the first embodiment.
Figure 2B:
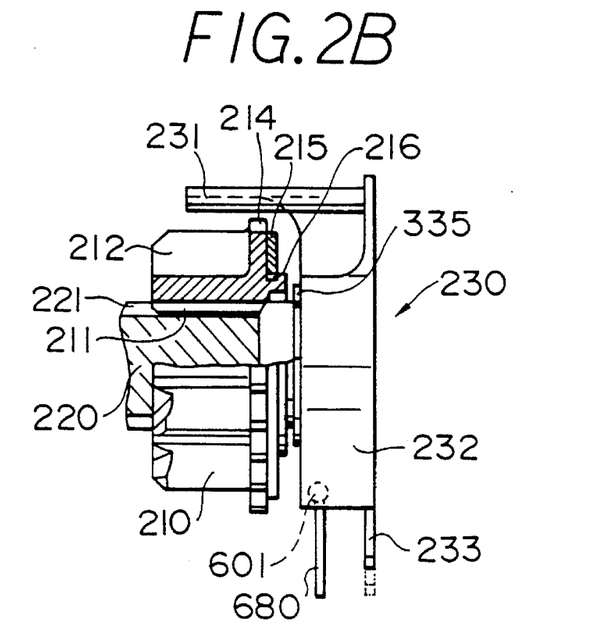

As shown in FIG. 1, FIG. 2A and FIG. 2B, the pinion gear 210 that engages the engine ring gear 100 is formed on pinion 200.

A pinion helical spline 211 that fits with a helical spline 221 formed on an output shaft 220 is formed on the inner circumference of the pinion gear 210.

A flange 213 of which outer diameter dimensions are larger than the pinion gear 210 is formed in a ring-shape on the pinion gear 210 on the side opposite to the ring gear side. Notches 214 of which the number is larger than that of the outer teeth pinion gear 210 are formed on the outer circumference of the flange 213. These notches 214 fit with a restriction claw 231 on a later-described pinion rotation restriction member 230. A washer 215 can freely rotate and does not fall out in the axial direction at the rear of the flange 213 as a round ring portion 216 formed on the rear end of the pinion gear 210 is bent toward the outer circumference.

The pinion gear 210 is constantly energized biased toward the rear of the output shaft 220 or toward the motor side by a return spring 240 composed of compressed coil springs. The return spring 240 does not directly energize the pinion gear 210, but in this embodiment energizes the pinion gear 210 via a ring body 421 on a shutter 420 described later than opens and closes an opening portion 410 of the housing 400.

Pinion Rotation Restriction Member 230

The restriction claw 231 that forms the restriction portion extended in the axial direction to fit with the multiple notches 214 formed on the flange 213 of the pinion gear 210 is formed on one end of the rotation restriction portion 232. The restriction claw 231 fits with the notches 214 on the pinion gear 210. Furthermore, to improve the rigidity of the restriction claw 231, it is formed to extend in the axial direction, and have a cross-sectional L-shape that is bent toward the inner radial direction. (The claw is bar-shaped.) The rotation restriction portion 232 is pulled downward by a string-shaped member 680 in the figures according to the operation of magnet switch 600 so that the restriction claw 231 fits with one of the notches 214 on the flange 213 of the pinion gear 210. At that time, one end 236 of the return spring portion 233 is contacted against the restriction shelf 362 to restrict the position, and the return spring portion 233 slacks. The restriction claw 231 is fit with the notches 214 of the pinion gear 210, so when rotation of the pinion gear 210 is attempted with an armature shaft 510 of the motor 500 and the epicycle mechanism 300, the pinion gear 210 advances to the left in FIG. 1 along the helical spline 221 of the output shaft 220. When the pinion gear 210 contacts the ring gear 100, and the advance of the pinion gear 210 is prevented, the pinion rotation restriction member 230 slacks due to the further rotational force of the output shaft 210. The pinion gear 210 will rotate slightly and engage the ring gear 100. When the pinion gear 210 advances, the restriction claw 231 is disengaged from the notches 214, and the restriction claw 231 drops behind the rear of the flange 213 of the pinion gear 210. The front end of the restriction claw 231 contacts the rear surface of the washer 214 and retraction of the pinion gear 210 is prevented by the rotation of the engine ring gear 100.

Pinion Fitting Ring 250

A pinion fitting ring 250 is fixed on the cross-sectional rectangular ring groove formed on the periphery of the output shaft 220. This pinion fitting ring 250 is formed by round-machining cross-sectional rectangular steel material. Approximate S-shaped notch 251 (example of fitting means) is formed on both ends so that one convex notch fits with the other concave notch, and one convex notch fits with the other concave notch.

Epicycle Gear Mechanism 300

The epicycle gear mechanism 300 shown in FIG. 1 is a deceleration or speed reduction means that decelerates the rotation of the motor 500 transferred to the output shaft 220 as explained later and increases the motor output torque. The epicycle gear mechanism 300 is composed of a sun gear 310 formed on the front outer circumference of a motor armature shaft 510 (explained later), multiple planetary gears 320 that are engaged with the sun gear 310 and that rotate around the sun gear 310, a planet carrier 330 that rotatably supports the planetary gears 320 around the sun gear 310 and that is integrated with the output shaft 220, and a tubular resin internal gear 340 that is engaged with the planetary gears 320 on the outer circumference of the planetary gears 320.

Overrunning Clutch 350

Figure 3:
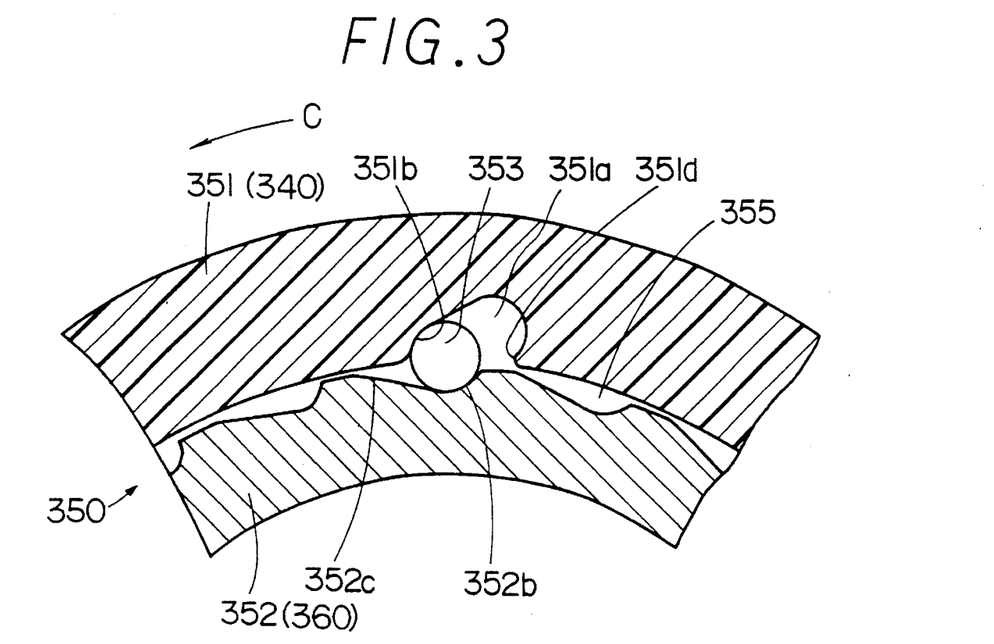
FIG. 3 is an enlarged cross-sectional view illustrating the overrunning clutch in the first embodiment.

As shown in detail in FIG. 3, an overrunning clutch 350 rotatably supports the internal gear 340 in one direction (only in direction rotatable with engine rotation). The overrunning clutch 350 is composed of a clutch outer member 351 that acts as the first cylindrical portion integrated with the front side of the internal gear 340, a ring-shaped clutch inner member 352 that acts as the second cylindrical portion arranged to oppose the inner circumference of the clutch outer member 351 and that is formed on the rear surface of a center bracket 360 that acts as the fixing side that covers the front side of the epicycle gear mechanism 300, and a roller 353 stored in a groove or roller storage portion 351a formed at an inclination to the inner circumference surface or second, outer groove of the clutch outer member 351. This roller storage portion 351a is inclined radially outwardly and circumferentially, and has a roller fitting surface 351b that fits with the roller 353 during driving the starter with reduction mechanism. The roller storage portion 351a has a radial depth which is sufficient to receive the roller 353 therein so that the clutch outer member 351 and clutch inner member 352 are not engaged through the roller.

Multiple roller groove portions or first, inner grooves 355 are formed circumferentially on the outer circumference of clutch inner member 352. These roller groove portions 355 comprise roller fitting surface 352b that fits with the roller 353 when the starter with reduction mechanism starts, and the roller guide surface 352c that leads to this roller storage portion 352b. On the circumferentially opposite surface of the roller fitting surface 351b of the roller storage portion 351a, is a roller storage guide portion 351d that functions to lift the roller 353 up to the roller storage portion 351a when the starter with reduction mechanism overruns as described later.

The positional relation of the roller fitting surface 351b and roller fitting surface 352b is configured so that the roller 353 is sandwiched from before and after the torque conveyance direction by each surface when the starter with reduction mechanism is driven. The roller storage portion 351a of the clutch outer member 351 is set so that the maximum inner diameter of the roller 353 is slightly larger than the maximum outer diameter of the clutch inner member 352 so that the clutch outer member 351 rotates freely when the roller 353 is stored during overrunning of the starter with reduction mechanism. It is to be understood that the above-described structure shown in FIG. 3 is provided circumferentially so that the roller 353 and the space 351a are provided at a plurality of locations.

With this type of structure, the first cylindrical portion set on the internal gear 340 of the epicycle gear mechanism 300 acts as the clutch outer member 351, and the second cylindrical portion which acts as the fixing side is used as the clutch inner 352 to form the roller storage portion 351a for the roller 353 on the inner circumference of the clutch outer member 351. Thus, if the starter is overrun by the engine, when the internal gear 340 that forms the clutch outer member 351 run idly to the clutch inner member 352 to absorb the rotational difference between the motor 500 and pinion gear 210 when the starter is overrun by the engine, the roller 353 receives the centrifugal force and separates from the outer circumference of the clutch inner member 352. This prevents abnormal wear of the roller 353 or outer circumference of the clutch inner member 352.

Furthermore, a large stress like the roller-type overrunning clutch using a wedge-effect for the contact portion of the roller engagement surface 352b and roller 353 is not applied on the clutch inner member 352 that is the second cylindrical portion. Therefore, the overrunning clutch with a large torque capacity can be provided. As the overrunning clutch 350 uses the center bracket 360 to rotatably support the output shaft 220 via a bearing 370, the axial length does not need to be lengthened, and the size can be reduced.

Center Bracket 360

Figure 4:
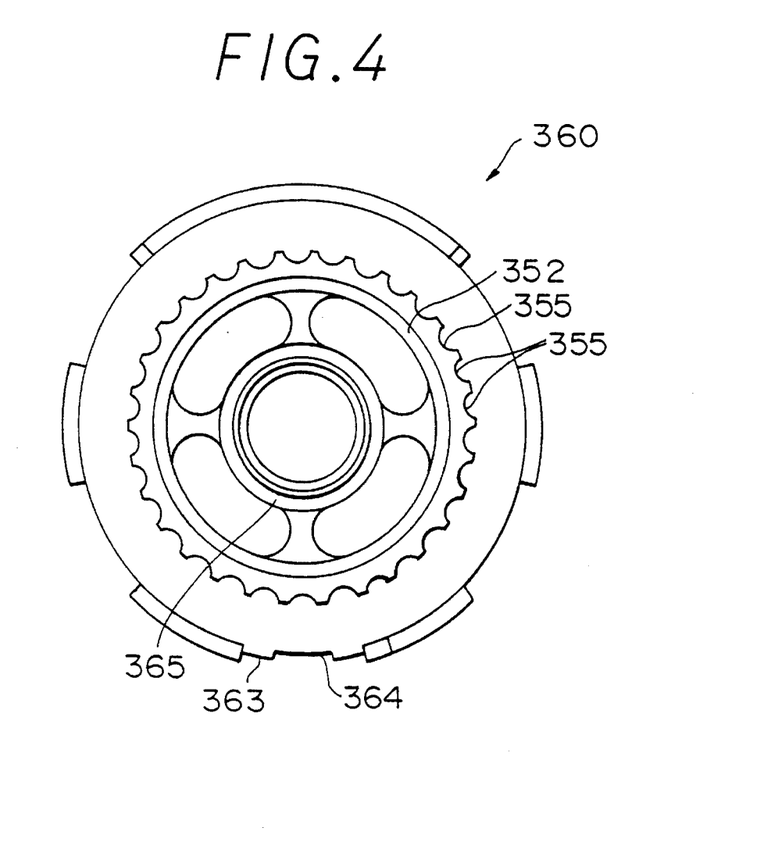
FIG. 4 is a rear side view illustrating the center bracket in the first embodiment.
Figure 5:
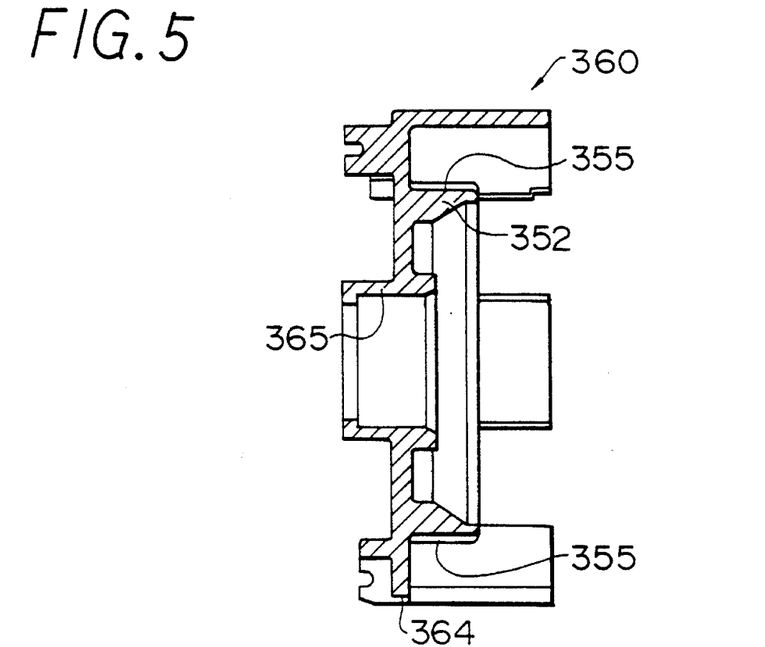
FIG. 5 is a cross-sectional view illustrating the side of the center bracket shown in FIG. 4.

The center bracket 360 shown in FIGS. 4 and 5 is arranged inside the rear side of the housing 400. The housing 400 and center bracket 360 are coupled with a ring spring 390 of which one end is fit to the housing 400 and the other end is fit to the center bracket 360. The rotational reaction received by the clutch inner 352 that forms a part of the overrunning clutch 350 is absorbed by the ring spring 390 so that the reaction is not directly conveyed to the housing 400.

Two support arms 361 that hold the pinion rotation restriction member 230 and the restriction shelf 362 mounted on the lower end of the pinion rotation restriction member 230 are set on the front of the center bracket 360. Furthermore, multiple notched portions 363 that engage the convex notched portions (not illustrated) on the inner side of the housing 400 are formed on the center bracket 360. The upper notched portions 353 are also used as air passages to lead air in the housing 400 into the yoke 501. Concave portions 364 are formed on the lower end of the center bracket 360 to pass the string-shaped member 680 (explained later) in the axial direction.

Planet Carrier 330

The planet carrier 330 has a flange-shaped projection portion 331 that extends in the radial direction to support the planetary gears 320. The pins 332 that extend toward the rear are fixed onto this flange-shaped projection portion 331, and these pins rotatably support the planet carrier 320 via the metal bearing 333.

The planet carrier 330 integral with the output shaft 220 is rotatably supported by a housing bearing 440 of which front end is fixed on the inner front of the housing 440 and a center bracket bearing 380 fixed inside the tubular portion 365 on the inner circumference of the center bracket 360.

This planet carrier 330 has a ring groove 334 on the front end position of the inner tubular portion 365, and the snap ring 336 is fit into this ring groove 334. A rotatable washer 335 mounted on the planet carrier 300 is inserted between the snap ring 336 and front end of the inner tubular portion 365. The backward movement of the planet carrier 330 is restricted by the direct contact of the snap ring 335 to the inner tubular portion 365 at the forward end via the washer 336. The rear end of the center bracket bearing 370 that supports the rear side of the planet carrier 330 has a flange portion 371 sandwiched between the rear end of the inner tubular portion 365 and the flange-shaped projection portion 331. The forward movement of the planet carrier 330 is restricted by the direct contact of the flange-shaped projection portion 331 to the rear end of the inner tubular portion 365 via the flange portion 371.

A concave notch 337 that extends radially is created on the rear side of the planet carrier 330. The forward end of the rotatable armature shaft 510 is supported via the planet carrier bearing 380 arranged in this concave notch 337.

Housing 400

The housing 400 supports the output shaft 220 with the housing bearing 440 fixed on the inner front end of the housing 400, and has a water barrier wall 460 that acts as a projection portion to keep the clearance between the housing 400 and the outer diameter of the pinion gear 210 at the lower portion of the opening 410 at a minimum to reduce the entering of rain water, etc., from the opening 410. On the lower front end of the housing 400, two sliding grooves (not shown) that extend axially are created so that the shutter 420 is set movably in these slide grooves.

Shutter 420

The shutter 420, is made of a resin material such as nylon, is mounted on the periphery of the output shaft 220 and is configured of the ring body 421 sandwiched between the return spring 240 and the pinion gear 210, and the water barrier portion 422 that opens and closes the opening portion 410 of housing 400.

When the pinion gear 210 starts to advance along the output shaft 220 when the starter starts, the ring body 421 also advances with the pinion gear 210. The water barrier portion 422 integrated with the ring body 421 also advances, opening the opening portion 420 of the housing 400. When the starter stops and the pinion gear 210 retracts along the output shaft 210, the ring body 421 also retracts with the pinon gears 210. The water barrier portion 422 integrated with the ring body 421 also retracts, closing the opening portion 410 of the housing 400. As a result, the shutter 420 that acts as an opening/closing means preventing rain water that splatters due to the centrifugal force of the ring gear 100 from entering the housing 400 when the starter is not operating.

Seal Member 430

A ring-shaped groove is formed on the end of the seal member 430, and one end of the return spring 240 is set inside this ring-shaped groove. This seal member 430 seals the periphery of the output shaft 220 so the rain water or dust that enters from the opening portion 410 of the housing 400 is prevented from entering the housing bearing 440 on the front end of the housing 400.

Motor 500

The motor 500 is enclosed by a yoke 501, motor wall 800 and the brush holding member 900 explained later. The motor wall 800 sandwiches the epicycle gear mechanism 300 between the center bracket 360, and prevents the lubrication oil in the epicycle gear mechanism from entering the motor 500.

As shown in FIG. 1, the motor 500 is composed of the armature shaft 510, an armature 540 fixed to this armature shaft 510 and composed of the armature core 520 and armature coil 530 that integrally rotate, and fixed magnetic pole 550 that rotates the armature 540. The field magnetic pole is fixed to the inner circumference of the yoke 501.

Armature Shaft 510

The armature shaft 510 is rotatably supported by the planet carrier bearing 380 on the inner rear of the planet carrier 330 and a brush holding member bearing 564 fixed on the inner circumference of the brush holding member 900. The front end of this armature shaft 510 is inserted through the inner side of the epicycle gear reduction mechanism 300, and as mentioned above the sun gear 310 of the epicycle gear reduction mechanism 300 is formed on the outer circumference of the forward end of the armature shaft 510.

Armature Coil 530

Figure 6:
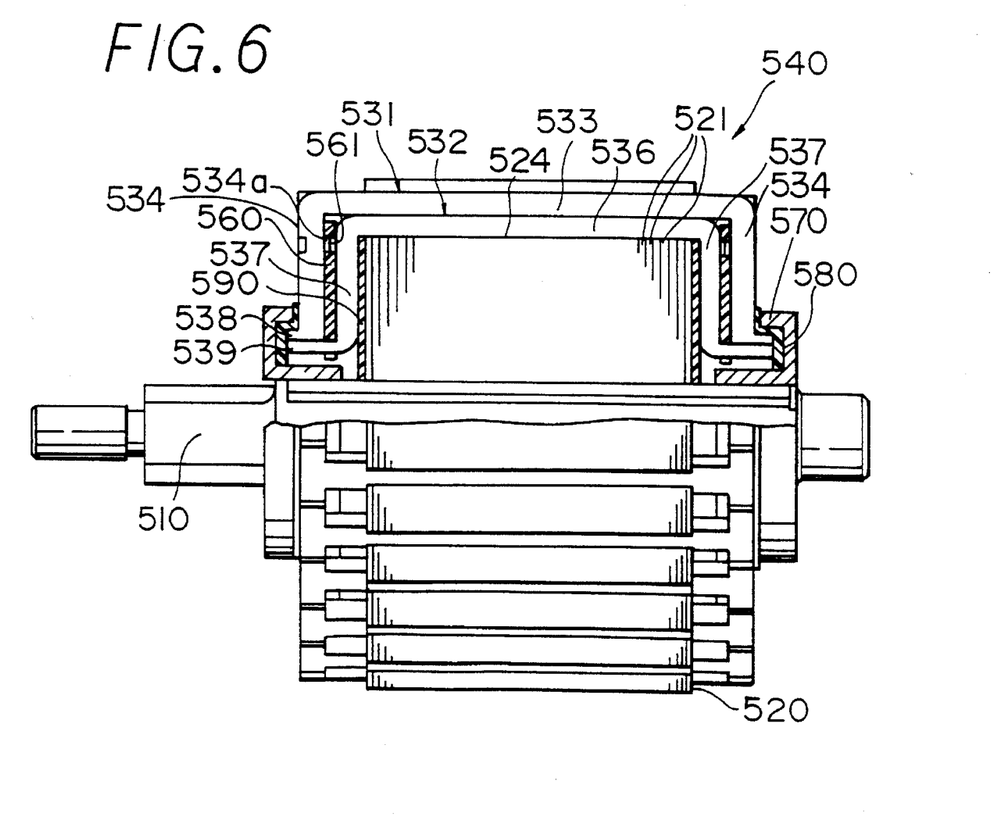
FIG. 6 is a side cross-sectional view illustrating the armature in the first embodiment.

In this embodiment, as shown in detail in FIG. 6, multiple (for example 25) upper coil bar 531 and the same number of lower coil bar 532 are used for the armature coil 530. Each of the upper coil bar 531 and lower coil bar 532 are radially piled to form two layer winding coils. Each upper coil bar 531 and each lower coil bar 532 are combined, and the ends of each upper coil bar 531 and each lower coil bar 532 are electrically connected operatively to form a ring-shaped coil.

Upper Coil Bar 531

The upper coil bar 531 is composed of a material such as copper having an outstanding conductivity and has an upper coil piece 533 that is held in the outer circumference of a slot 524 formed axially through a stack of iron sheets 521, and that extends in parallel to the fixed magnetic pole 550, and has two upper coil ends 534 that are bent radially inward from both axial ends of the upper coil piece 533 and that extend perpendicularly to the axial direction of the armature shaft 510. The upper coil piece 533 and the two upper coil ends 534 can be integrally shaped with cold forging, bent and formed in a U-shape with a press, or can be separately formed upper coil piece 533 and two upper coil ends 534 that are connected by welding.

Lower Coil Bar 532

As with the upper coil bar 531, the lower coil bar 532 has a lower coil piece 536 composed of a material such as copper having an outstanding conductivity that is held in the outer circumference of the slot 524 and that extends in parallel to the fixed magnetic pole 550, and has two lower coil ends 537 that are bent radially inward from both ends of the lower coil piece 536 and that extend perpendicularly to the axial direction of the shaft 510. The lower coil piece 536 and the two lower coil ends 537 can be integrally cold casting, bent and formed in a U-shape with a press, or can be separately formed lower coil piece 536 and two lower coil ends 537 that are connected with welding, etc., as with the upper coil bar 531.

The insulation of each upper coil end 534 and each lower coil end 537 is ensured with an insulation spacer 560. The insulation between each lower coil end 537 and the armature core 520 is ensured with a resin (e.g., nylon or phenol resin) insulation ring 590.

An upper inner extension portion 538 that extends axially is formed on the inner circumference ends of the two upper coil ends 534. The lower inner extension portion 539 on the inner end of the lower armature coil 532 explained above is layered with the inner circumference of this upper inner extension portion 538. These are electrically and mechanically connected with connection technology such as welding. The outer circumference of the upper inner extension portion 538 contacts the inner surface of the outer circumference ring portion of a fixing member 570 press-fixed onto the armature shaft 510 via with an insulation cap 580.

In this armature 540, the upper coil ends 534 on both ends of the upper coil bar 531 and the lower coil ends 537 on both ends of the lower coil bar 532 that compose the armature coil 530 are each set to be perpendicular to the axial direction of the armature shaft 510. Therefore, the axial length of the armature 540 can be reduced, the axial length of the motor 500 can also be reduced, and the starter can be smaller than the conventional structure.

Fixed Magnetic Pole 550

In this embodiment, the fixed magnetic pole 550 is configured by the permanent magnets. Field coils that generate a magnetic force electrically can be used instead of the permanent magnets.

Magnet Switch 600

As shown in FIG. 1, the magnet switch 600 is held by the brush holding member 900 explained later and is arranged in the end frame 700 explained later. The magnet switch 600 is fixed to be approximately perpendicular to the armature shaft 510.

With electrical conductivity, the magnet switch 600 drives a plunger 610 upward, and contacts two contacts (lower movable contact 611 and upper movable contact 612) that move integrally with the plunger 610 to sequentially contact with a head 621 of a terminal bolt 620 and a contact portion 631 of a fixed contact 630. A battery cable not illustrated is connected to the terminal bolt 620.

A plunger shaft 615 that extends upward over the plunger 610 is fixed on the upper side of the plunger 610. This plunger shaft 615 protrudes upward from the through hole on the center of a stationary core 642. The upper movable contact 612 that slides freely through the vertical direction along the plunger shaft 615 is located on the upper side of the stationary core 642 of the plunger shaft 615.

Figure 7:
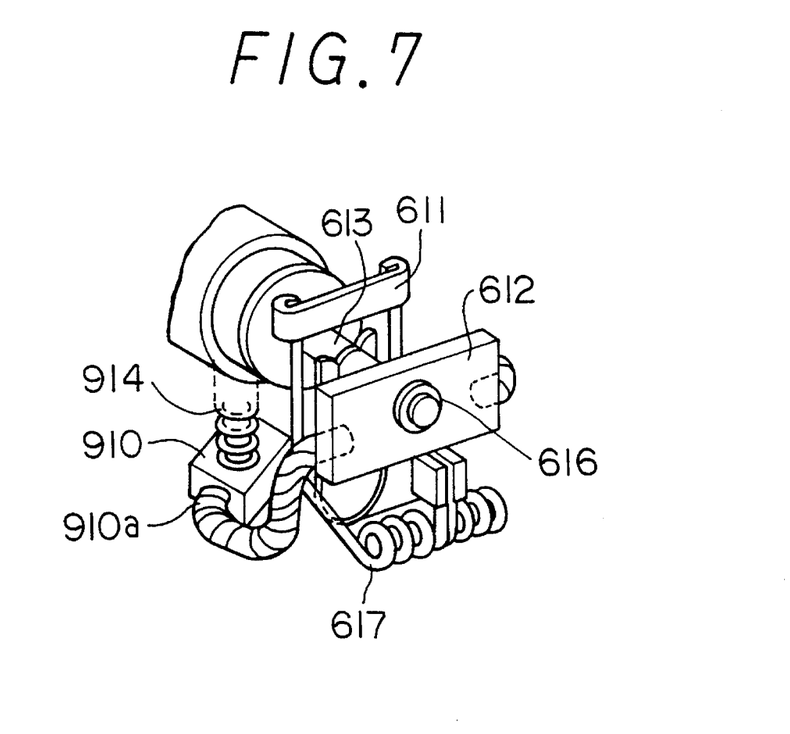
FIG. 7 is a perspective view illustrating a part of the magnet switch in the first embodiment.

This upper movable contact 612 is restricted from moving over the upper end of the plunger shaft 615 by a fixing ring 616 installed on the upper end of the plunger shaft 615 as shown in FIG. 7 As a result, the upper movable contact 612 slides freely in the vertical direction along plunger shaft 615 between the fixing ring 616 and stationary core 642. The upper movable contact 612 is constantly energized or biased upward by the contact pressure spring formed by the plate spring installed on the plunger shaft 615.

The upper movable contact 612 is composed of a metal such as copper having an outstanding conductivity. When both ends of the upper movable contact 612 move upward, the two contact portions 631 on the fixed contact 630 are contacted. Each lead wire 910a for the pair of brushes 910 is electrically and mechanically connected with caulking or welding to the upper movable contact 612. The ends of resistors 617 that act as multiple restriction means (two in this embodiment) are inserted and electrically and mechanically fixed to the grooves on the upper movable contact 612.

Each lead wire 910a for the pair of brushes 910 is electrically and mechanically connected with caulking or welding to the upper movable contact 612, however, the upper movable contact 612 and each lead wire 910a of the brush 910 can be integrally formed.

The resistor 617 is used to slow the motor rotation when the starter initially starts. Metal wires with a large resistance value are wound to configure the resistor 617. The lower movable contact 611 located below the head portion 621 of the terminal bolt 620 is fixed with caulking, etc., to the other end of the resistor 617.

The lower movable contact 611 is composed of a metal such as copper having an outstanding conductivity. This contacts the upper surface of the stationary core 642 when the magnet switch 600 stops and the plunger 610 is at the lower position. When the resistor 617 moves upward with the movement of the plunger shaft 615, the lower movable contact 611 will contact the head portion 621 of the terminal bolt 620 before the upper movable contact 612 contacts the contact portion 631 of the fixed contact 630.

Further detail of the magnet switch 600 is omitted for brevity because it is not essential. Disclosure of the copending Shiga et al U.S. application Ser. No. (not known) filed Dec. 6, 1994 and assigned to the same assignee of the present application is incorporated herein by reference.

End Frame 700

Figure 8:
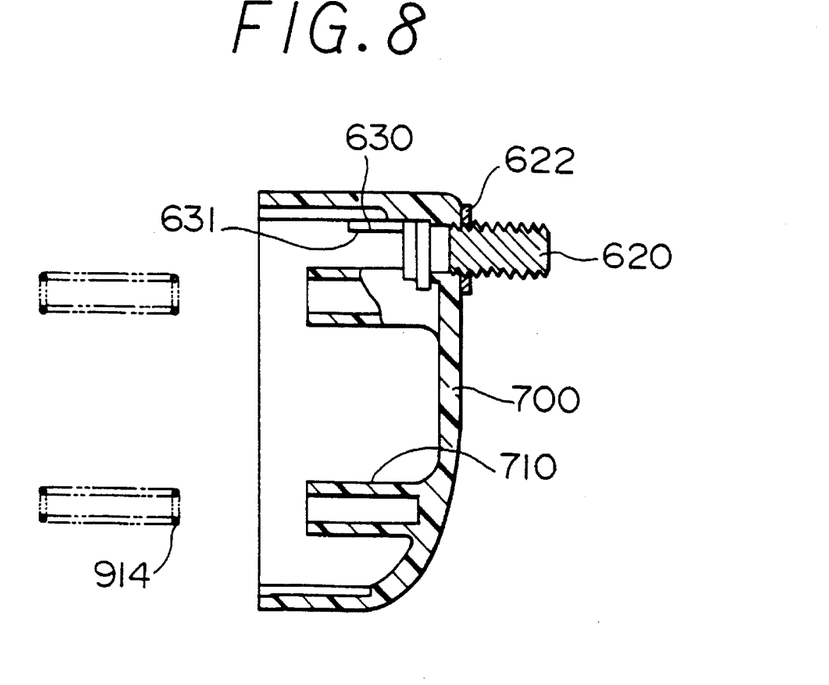
FIG. 8 is a cross-sectional view illustrating the end frame and brush spring in the first embodiment.

As shown in FIG. 8, the end frame 700 is a magnet switch cover made of resin such as phenol resin. The magnet switch 600 is stored inside the frame. A spring holding pole 710 that holds a compressed coil spring 914 that energizes or biases the brush 910 toward the front is installed on the rear side of the end frame 700 to protrude forward according to the brush 910 position.

Brush Holding Member 900

Figure 9:
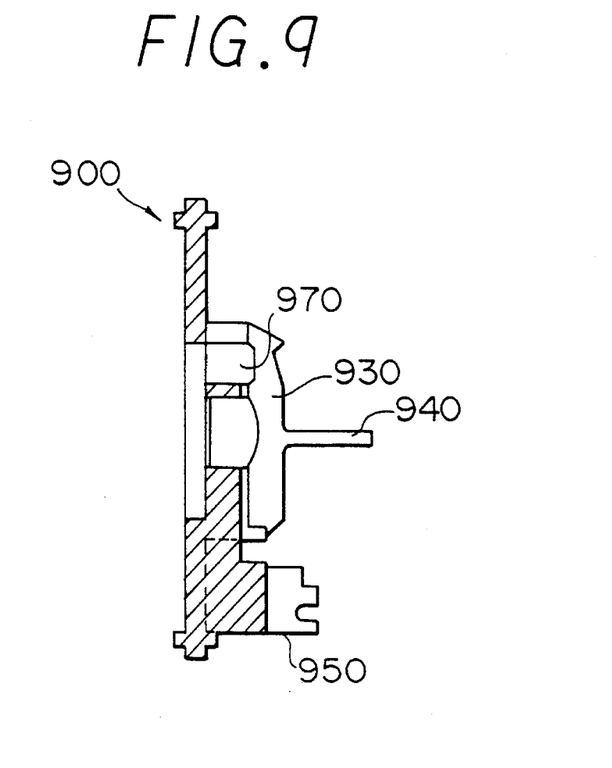
FIG. 9 is a vertical cross-sectional view illustrating the brush holding member in the first embodiment.
Figure 10:
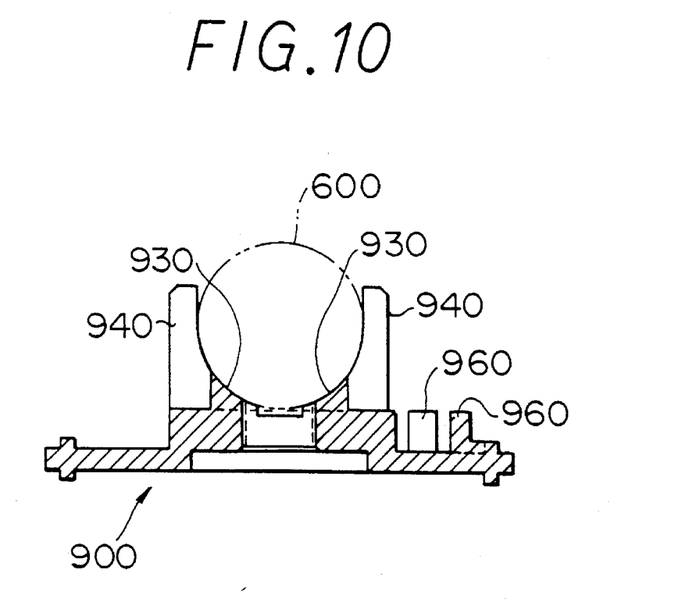
FIG. 10 is a horizontal cross-sectional view illustrating the brush holding member in the first embodiment.

The brush holding member 900 shown in FIGS. 9 and 10 separates the inner side of the yoke 501 and inner side of the end frame 700 and functions to rotatably support the end of the armature shaft 510 via the brush holder bearing 564. In addition, the brush holding member 900 can act as the brush holder, can support the magnet switch 500, and can hold a pulley 690 that guides the string-shaped member 680. The brush holding member 900 has a hole not illustrated through which the string-shaped member 680 is passed.

The front end of the brush 910 is energized to the rear side of the upper coil end 534 on the rear side of armature coil 530 by compressed coil spring 914. With regard to the brush holding member 910 is simplified herein for brevity. Instead, the disclosure of the copending Shiga et al U.S. application Ser. No. (not known) filed Dec. 6, 1994 and assigned to the same assignee as the present application is incorporated herein by reference.

Operation

Next, the operation of the above starter will be explained according to the electrical circuit diagrams shown in FIGS. 11A through 11C.

Figure 11A:
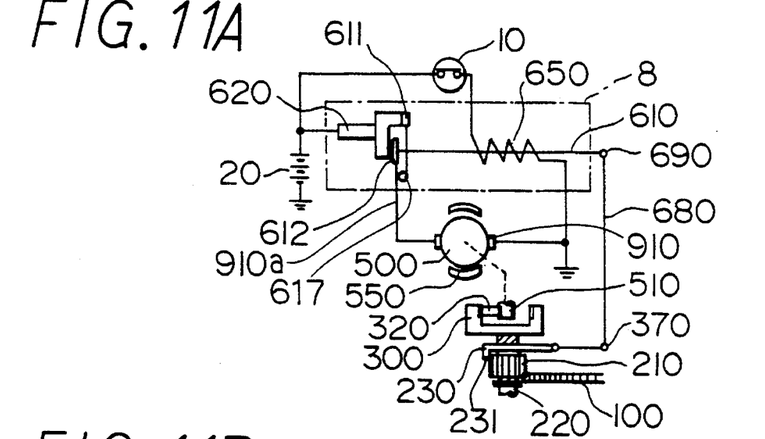
FIGS. 11A, 11B and 11C are electrical circuit diagrams indicating the operational states of the first embodiment.

When a key switch 10 is set to the start position by an operator as shown in FIG. 11A, the attraction coil 650 in the magnet switch 600 is energized by battery 20. When attraction coil 650 is energized, the plunger 610 is attracted by the magnetic force generated by the attraction coil 650 so that it is lifted upward (leftward in FIG. 11A).

When plunger 610 starts to rise, the upper movable contact 612 and lower movable contact 611 also rise, and the rear end of the string-shaped member 680 integral with the plunger 610 also rises. When the rear end of the string-shaped member 680 rises, the forward end of the string-shaped member 680 is pulled downward (rightward in FIG. 11A), and the pinion rotation restriction member 230 lowers. When the pinion rotation restriction member 230 lowers, and the restriction claws 321 engages one of the notches 214 on the circumference of the pinion gear 210, the lower movable contact 611 contacts the head 621 of the terminal bolt 620. The voltage from battery 20 is applied to the terminal bolt 620, and the voltage of the 0 terminal bolt 620 is conveyed to the upper brush 910 via the lower movable contact 611, resistor 617, upper movable contact 612 and lead wire 910a. In other words, the low voltage conveyed with the resistor 617 is conveyed to the armature coil 530 via the upper brush 910. As the lower brush 910 is constantly grounded via the brush holding member 900, the armature coil 530 configured with upper coil bar 531 and lower coil bar 532 combined into a coil is energized with a low voltage. The armature coil 530 then generates a relatively weak magnetic force. This magnetic force acts on (attracts or repulses) the magnetic force of the fixed magnetic poles 550, causing the armature 540 to rotate at a low speed.

When the armature shaft 510 rotates, the planetary gears 320 in the epicycle gear mechanism 300 are rotated and driven by the sun gear 310 on the front end of the armature shaft 510. If the planetary gears 320 apply the rotary torque of the direction wherein the ring gear 100 is rotated and driven to the internal gear 340 via the planet carrier 330, the rotation of the internal gear 340 will be restricted by the function of the overrunning clutch. In other words, the internal gear 340 will not rotate, so the planet carrier 330 will decelerate and rotate due to the rotation of the planetary gears 320. If the planet carrier 330 rotates, the pinion gear 210 will also tend to rotate, but as the rotation of the pinion gear 210 is restricted by the pinion rotation restriction member 230, the pinion gear 210 will advance along the helical spline 221 of the output shaft 220.

When the pinion gear 210 advances, the shutter 420 will also advance causing the opening 410 of the housing 400 to open. With the advance of the pinion gear 210, the pinion gear 210 will completely engage with the engine ring gear 100, and then will contact the pinion fitting ring 250. When the pinion gear 210 advances, the restriction claw 231 will be disengaged from the notch 214 on the pinion gear 210, and then the restriction claw 231 will drop behind the washer 215 installed on the rear surface of the pinion gear 210.

Figure 11B:
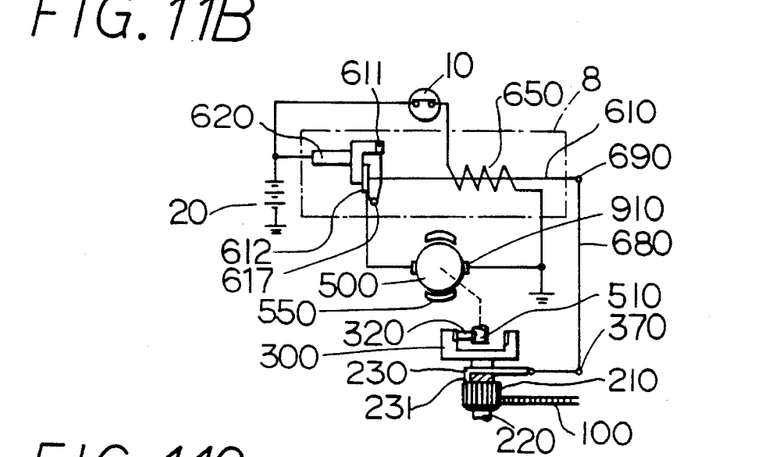

On the other hand, when the pinion gear 210 is advanced, the upper movable contact 612 will contact the contact portion 631 of the fixed contact 630 as shown in FIG. 11B. The battery voltage of the terminal bolt 620 will be directly conveyed to the upper brush 910 via the upper movable contact 612 and lead wire 910a. In other words, a high current will flow to the armature coil 530 configured of each upper coil bar 531 and each lower coil bar 532. The armature coil 530 will generate a large magnetic force, and will rotate the armature 540 at a high speed.

The rotation of the armature shaft 510 is decelerated by the epicycle gear mechanism 300 thus increasing the rotational torque, and the planet carrier 330 will be rotated and driven. At this time, the front end of the pinion gear 210 will contact the pinion fitting ring 250, and will rotate together with the planet carrier 330. Pinion gear 210 is engaged with the engine ring gear 100, so pinion gear 210 will rotate and drive the ring gear 100 thereby rotating and driving the engine.

When the engine rotation speed rises the engine rotation output is conveyed to the planetary gears 320 from the output shaft 220 during overrunning. The rotation speed of pinion gear 210 is higher than the rotation by the armature 540, and the clutch outer member 351 integrated with the internal gear 340 that engages the planetary gears 320 turn. Due to the centrifugal force, the roller 353 is stored in the roller storage space 351a of the clutch outer 351 by the roller storage guide portion 351d and roller guide portion 352c, and the clutch outer member 351 runs idly around the clutch inner member 352.

When the clutch outer member 351, or in other words the internal gear 340, runs idly, the conveyance of the engine rotation force to the sun gear 310 formed on the armature shaft 510 is stopped, preventing the armature 540 from overrunning.

Next, when the engine starts and the engine ring gear 100 rotate faster than the pinion gear 210, a force to retract the pinion gear 210 will occur due to the function of the helical spline. The retraction of the pinion gear 210 will be prevented by the rotation restriction claw 231 that has dropped behind the pinion gear 210, and will prevent early separation of the pinion gear 210. Thus, the engine can be accurately started.

When the engine ring gear 100 rotates faster than the pinion gear 210 due to the starting of the engine, the pinion gear 210 will be rotated and driven by the rotation of the ring gear 100. The rotation torque conveyed to the pinion gear 210 from the ring gear will be conveyed via the planet carrier 330 to the pins 332 that support the planetary gears 320. In other words, the planetary gears 320 are driven by the planet carrier 330. As a torque rotating in reverse of that when the motor is started will be applied on the internal gear 340, the overrunning clutch 350 will allow rotation of ring gear 100. In other words, when a torque rotating in reverse to that when the motor is started is applied on the internal gear 340, the roller 353 of the overrunning clutch 340 will separate from the concave notch 355 on the clutch inner member 352, and rotation of the internal gear 340 will be possible.

When the engine starts, the relative rotation wherein the engine ring gear 100 rotates and drives the pinion gear 210 will be absorbed by the overrunning clutch 350 and the armature 540 will not be rotated and driven by the engine.

Figure 11C:
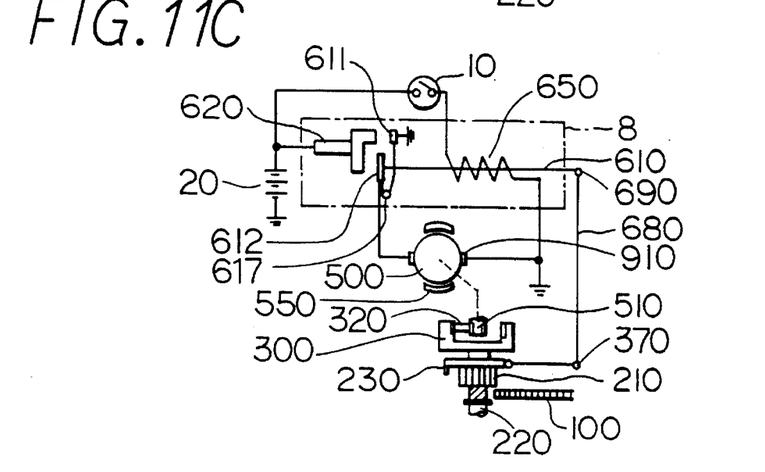

When the engine is started, the key switch 10 is removed from the start position by the operator as shown in FIG. 11C, and the conductivity to the attraction coil 650 in the magnet switch 600 is stopped. When the energizing the attraction coil 650 is stopped, the plunger 610 will return downward due to the function of the compressed coil spring 660.

The upper movable contact 612 will be separated from the contact portion 631 of the fixed contact 630, and then the lower movable contact 611 will also be separated from the head portion 621 of the terminal bolt 620 causing the conductivity to the upper brush 910 to be stopped.

When the plunger 610 is returned downward, the pinion rotation restriction members 230 will return upward due to the function of the return spring 236 of the pinion rotation restriction member 230, and the restriction claw 231 will be separated from behind the pinion gear 210. The pinion gear 210 will be returned backward by the function of the return spring 240, and the engagement of the pinion gear 210 and engine ring gear 100 will be disengaged. At the same time, the rear end of the pinion gear 210 will contact the flange-shaped projection portion 222 on the output shaft 220. In other words, the pinion gear 210 is returned to the position before the starter started.

When the plunger 610 is returned downward, the lower movable contact 611 contacts the upper surface of the stationary core 642 of the magnet switch 600, and the lead wires 910a of the upper brush 910 are conducted in the order of upper movable contact 612, resistor 617, lower movable contact 611, stationary core 642, magnet switch cover 640 and brush holding member 900 which are all made of electrically conductive material. In other words, the upper brush 910 and lower brush 901 are short circuited via brush holding material 900. On the other hand, an electromotive force is generated on the armature coil 530 by the coasting rotation of the armature 540. This electromotive force is short circuited via the upper brush 910, brush holding member 900 and lower brush 910, and thus a braking force is applied on the coasting rotation of the armature 540. As a result, the armature 540 stops instantly.

Advantage of the Embodiment

The first cylindrical portion set on the internal gear 340 of the epicycle gear mechanism 300 acts as the clutch outer member 351, and the second cylindrical portion which acts as the fixing side is used as the clutch inner member 352 to form the roller storage portion 351a for the roller 353 on the inner circumference of the clutch outer member 351. Thus, if the starter is overrun by the engine, when the internal gear 340 that is the clutch outer member 351 run idly to the clutch inner member 352 to absorb the rotational difference between the motor 500 and pinion gear 210 when the starter is overrun by the engine, the roller 353 receives the centrifugal force and separates from the outer circumference of the clutch inner member 352. This prevents abnormal wear of the roller 353 or outer circumference of the clutch inner member 352.

Roller grooves 355 are also formed on the clutch inner member 352 that is the second cylindrical portion so as to store part of the roller 353. The roller 353 is passed through there, and is sandwiched in the front and rear torque conveyance direction by the roller fitting portion 352b and roller guide surface 352c of the roller grooves 355, so a large stress such as the roller type overrunning clutch using a wedge-effect is not applied on each contact surface and the contact surface with the roller 353. Thus, an overrunning clutch 350 with a large torque capacity can be provided.

As the overrunning clutch 350 uses the space on the outer circumference side of the center bracket 360 to rotatably support the output shaft 220 via the bearing 370, the axial length does not need to be lengthened, and the size can be reduced. By integrating the clutch inner member 352 with the center bracket 360, the number of parts can be reduced.

Second Embodiment

Figure 12:
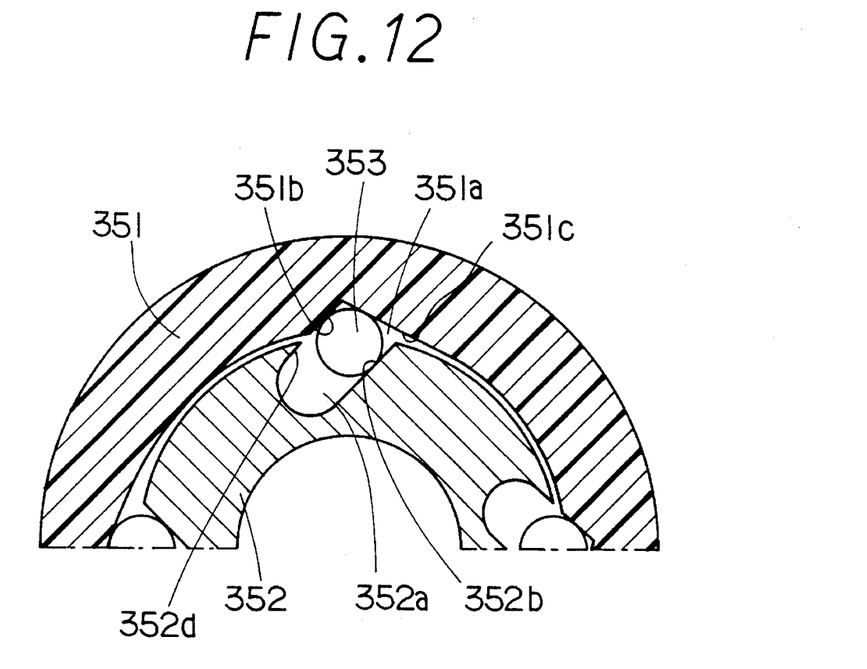
FIG. 12 is an enlarged cross-sectional view illustrating the overrunning clutch in the second embodiment.

The second embodiment will be described with reference to FIG. 12. It is to be understood that the same reference numerals are used for the configuration elements of the functions common with the first embodiment.

In the second embodiment, a second storage groove 352a for storing the roller 353 is formed on the outer circumference of the clutch inner member 352 at a position where the inner circumference of the clutch outer member 351 is not contacted. The first groove 351a for storing part of the roller 353 is formed on the inner member circumference of the clutch outer 351.

Third Embodiment

Figure 13:
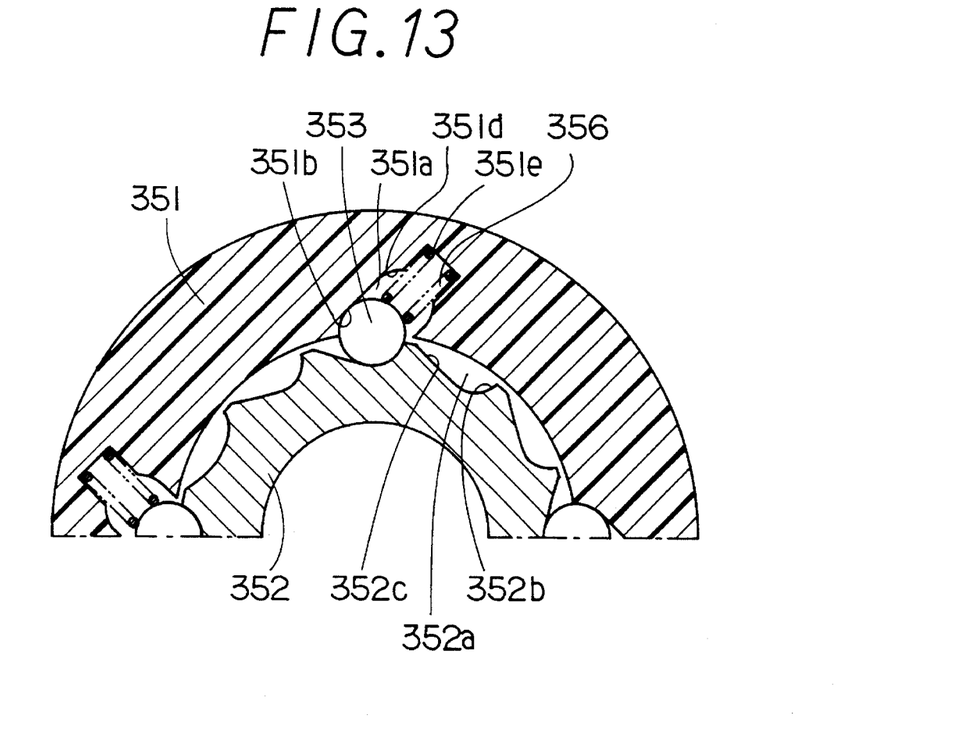
FIG. 13 is an enlarged cross-sectional view illustrating the overrunning the clutch in the third embodiment.

As shown in FIG. 13, the third embodiment has a roller pressing spring 356 set in the roller storage portion 351a of the clutch outer member 351 so that the roller 353 is press-fit in the roller groove portion 352a of the clutch inner member 352. At the same time, the roller pressing spring storage portion 351e for storing one end of the roller pressing spring 356 is set in the roller storage portion 351a. Furthermore, the roller engagement surfaces 351b and 352b set on the clutch outer 351 and clutch inner 352, respectively, are configured with a curve of which curvature radius is approximately the same as that of the roller 353.

The present invention has been described with reference to the presently preferred three embodiments. It is to be understood, however, that the present invention should not be limited to those exemplary embodiments but it may be modified in many ways without departing from the spirit of the invention.

What is claimed is:

1. A starter comprising:

an electric motor having an armature shaft;

an output shaft engageable with an engine ring gear; and an overrunning clutch disposed between said armature shaft and said output shaft, said clutch including a clutch inner member shaped in a cylindrical form and having first grooves on an outer circumference thereof, a clutch outer member shaped in a cylindrical form and having second grooves on an inner circumference thereof opposing said outer circumference of said clutch inner member, and rollers set between said clutch inner member and said clutch outer member, wherein at least one of said clutch inner member and said clutch outer member is formed of a resin or nonferrous metal, and wherein one of said first and second grooves has a radial depth that can store said rollers therein so that said rollers allow noncontact relation between said clutch outer member and said clutch inner member during overrunning of said output shaft.

2. The starter according to claim 1, wherein said second grooves of said clutch member outer have said radial depth to store said rollers to a position where said outer circumference of said clutch inner member is not contacted by said rollers.

3. The starter according to claim 2, wherein the number of said first grooves of said clutch inner member is greater than that of said second grooves.

4. The starter according to claim 2, wherein said first grooves have a curvature radius approximately the same as a radius of said rollers.

5. The starter according to claim 1, wherein part of said first and second grooves have a curvature radius approximately the same as a radius of said rollers, and wherein said rollers contact both said first and second grooves.

6. The starter according to claim 1, wherein said one of said first and second grooves extend radially and circumferentially, and all of said grooves have respective fitting surfaces which receive said roller thereon for torque transmission in a circumferential direction.

7. The starter according to claim 6, wherein an other of said first and second grooves include an inclined roller guide surface that leads to the roller fitting portion.

8. The starter according to claim 3, wherein the number of said first grooves is an integer multiple of the number of said rollers and all of said rollers are received in said second grooves at the same time, said integer multiple being equal to two or more.

9. The starter according to claim 8, wherein said first grooves have a curvature radius approximately the same as a radius of said rollers.

10. The starter according to claim 8, wherein part of said first and second grooves have a curvature radius approximately the same as a radius of said rollers, and wherein said rollers contact both said first and second grooves.

11. A starter comprising:

an electric motor including an armature shaft;

an output shaft for driving an engine when driven by said armature shaft; and an overrunning clutch operatively coupling said armature shaft and said output shaft, said clutch including an inner cylindrical member, an outer cylindrical member disposed coaxially with said inner cylindrical member and a roller disposed between said inner and outer cylindrical members, said inner and outer cylindrical members having respective inner and outer grooves facing each other and receiving therein said roller, one of said inner and outer grooves having a radial depth which is close to a diameter of said roller so that said roller is stored substantially fully therein, and said one of inner groove and outer groove being formed radially and circumferentially, a number of one of said inner and outer grooves being larger than a number of the other of said inner and outer grooves and wherein said larger number is an integer multiple of the smaller number.

12. A starter according to claim 11, wherein at least one of said inner and outer cylindrical members is made of resin.

13. A starter according to claim 11 further comprising:

a sun gear formed on said armature shaft;

planetary gears engaged with said sun gear;

an internal gear engaged with said planetary gears and integrally formed with said outer cylindrical member; and a center bracket coaxially mounted on said output shaft and integrally formed with said inner cylindrical member.

* * * * *